United States Patent
Takami et al.

(10) Patent No.: US 10,230,982 B2
(45) Date of Patent: Mar. 12, 2019

(54) IMAGE ENCODING APPARATUS AND METHOD, AND IMAGE DECODING APPARATUS AND METHOD

(71) Applicant: JVC KENWOOD Corporation, Yokohama-shi, Kangawa (JP)

(72) Inventors: Maki Takami, Yokohama (JP); Hideki Aiba, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 270 days.

(21) Appl. No.: 15/222,148

(22) Filed: Jul. 28, 2016

(65) Prior Publication Data

US 2017/0070749 A1    Mar. 9, 2017

(30) Foreign Application Priority Data

Sep. 3, 2015  (JP) .................................. 2015-173545

(51) Int. Cl.

| H04B 1/66  | (2006.01) |
|---|---|
| H04N 7/12  | (2006.01) |
| H04N 11/02 | (2006.01) |
| H04N 11/04 | (2006.01) |
| H04N 19/593 | (2014.01) |
| H04N 19/42 | (2014.01) |

(52) U.S. Cl.
CPC ........... *H04N 19/593* (2014.11); *H04N 19/42* (2014.11)

(58) Field of Classification Search
CPC ..................................................... H04N 19/42
See application file for complete search history.

(56) References Cited

U.S. PATENT DOCUMENTS

| 2009/0092326 A1* | 4/2009 | Fukuhara | H04N 19/139 |
| | | | 382/233 |
| 2011/0182357 A1* | 7/2011 | Kim | H04N 19/167 |
| | | | 375/240.12 |
| 2014/0247983 A1* | 9/2014 | MacInnis | H04N 19/14 |
| | | | 382/166 |
| 2014/0269904 A1* | 9/2014 | Zhou | H04N 19/157 |
| | | | 375/240.03 |
| 2014/0362098 A1* | 12/2014 | Kerofsky | G06T 1/60 |
| | | | 345/547 |
| 2016/0007025 A1* | 1/2016 | Kaya | H04N 19/159 |
| | | | 375/240.13 |

FOREIGN PATENT DOCUMENTS

JP          5582019 B2    7/2014

* cited by examiner

*Primary Examiner* — Jamie J Atala
*Assistant Examiner* — Fabio S Lima
(74) *Attorney, Agent, or Firm* — Nath, Goldberg & Meyer; Jerald L. Meyer (57) ABSTRACT

N (N≥2) time stretch units receive N channels of second image data which are obtained by dividing each line of first image data by N and are composed of a first number of bits. Each N time stretch unit arranges pixels of the N channels in the order of the pixels of the corresponding line of the first image data within a period which is obtained by stretching a one-line period of the second image data. The N time stretch units generate third image data including N lines of the first image data. N encoders encode each coding target pixel of the third image data outputted from the N time stretch units using a difference between the target pixel and a peripheral pixel to generate encoded data composed of a second number of bits which is smaller than the first number of bits.

6 Claims, 7 Drawing Sheets

IMAGE ENCODING APPARATUS AND METHOD, AND IMAGE DECODING APPARATUS AND METHOD

CROSS REFERENCE TO RELATED APPLICATION

This application is based upon and claims the benefit of priority under 35 U.S.C. § 119 from Japanese Patent Application No. 2015-173545, filed on Sep. 3, 2015, the entire contents of which are incorporated herein by reference.

BACKGROUND

The present disclosure relates to image encoding apparatus and method and image decoding apparatus and method using pixel-based prediction coding.

The size of high-resolution digital image data is large. Processing such digital image data of large size requires large capacity memory and transmission paths. Large capacity memory and transmission paths increase the cost. To reduce the capacities of memory and transmission paths, image encoding apparatuses are used to reduce the size of image data.

An image encoding apparatus described in Japanese Patent No. 5582019 (Patent Document 1) converts a difference between a coding target pixel and a peripheral pixel into encoded data.

SUMMARY

Conventional digital image processing apparatuses such as liquid crystal displays typically handle full high-definition (Full HD) image data. In recent years, image data called 4K or 8K, including 4 or 16 times as many pixels as that of Full HD data, has appeared and is becoming widespread.

The size of 4K or 8K image data is larger than that of Full HD image data. It is therefore effective to convert image data to encoded data using the image encoding apparatus to reduce the data size.

The dot clock frequency for 4K or 8K image data is much higher than that for Full HD image data. It is difficult for digital image processing apparatuses to operate with a high dot clock frequency. Each line of 4K or 8K image data is therefore divided into plural channels. Each channel of data is processed with a comparatively low frequency dot clock.

An image encoding apparatus which calculates a difference between a coding target pixel and a peripheral pixel (a pixel adjacent to the target pixel, for example) like the image encoding apparatus described in Patent Document 1, is configured to generate encoded data assuming processing of one channel of image data.

When image data is divided in plural channels, in some cases the coding target pixel is not correlated with the temporally adjacent pixel. The image encoding apparatus does not properly encode the image data and cannot encode plural channels of image data with high image quality.

A first aspect of the embodiments provides an image encoding apparatus to encode first image data in which each line includes a first number of pixels, including: N time stretch units configured to arrange pixels of N channels of second image data in the order of pixels in the respective lines of the first image data, within a period obtained by stretching a one-line period of the second image data to generate third image data including N lines of the first image data, the N channels of second image data being obtained by dividing the first image data by N and being composed of a first number of bits, the N being an integer equal to or greater than 2; and N encoders configured to encode each coding target pixel of the third image data outputted from the N time stretch units, using a difference between the target pixel and a peripheral pixel to generate encoded data composed of a second number of bits, which is smaller than the first number of bits.

A second aspect of the embodiments provides an image encoding method to encode first image data in which each line includes a first number of pixels, including: arranging pixels of N channels of second image data in the order of pixels in the respective lines of the first image data, within a period obtained by stretching a one-line period of the second image data to generate third image data including N lines of the first image data, the N channels of second image data being obtained by dividing the first image data by N and being composed of a first number of bits, the N being an integer equal to or greater than 2; and encoding each encoding target pixel of the third image data using a difference between the target pixel and a peripheral pixel to generate encoded data composed of a second number of bits, which is smaller than the first number of bits.

A third aspect of the embodiments provides an image decoding apparatus, including: N decoders configured to decode each decoding target pixel of N channels of encoded data, in which each line includes a first number of pixels and that is composed of a first number of bits, using a difference between the target pixel and a peripheral pixel to generate first image data composed of a second number of bits which is larger than the first number of bits, the N being an integer equal to or greater than 2; N time compressors configured to distribute the pixels included in each line of the first image data outputted from the N decoders, into parallel N channels within a period obtained by compressing a one-line period of the first image data, to generate N channels of second image data; and N selectors configured to select the respective N channels of second image data outputted from the N time compressors to generate N channels of third image data.

A fourth aspect of the embodiments provides an image decoding method including: decoding each decoding target pixel of N channels of encoded data, in which each line includes a first number of pixels, and that is composed of a first number of bits, using a difference between the target pixel and a peripheral pixel to generate first image data composed of a second number of bits, which is larger than the first number of bits, the N being an integer equal to or greater than 2; distributing the pixels included in each line of the first image data into parallel N channels within a period obtained by compressing a one-line period of the first image data, to generate N channels of second image data; and generating N channels of third image data by selecting the respective N channels of second image data.

DETAILED DESCRIPTION

Hereinafter, a description is given of image encoding apparatus and method and image decoding apparatus and method according to the embodiment with reference to the accompanying drawings.

<Image Encoding Apparatus and Method>

The image encoding apparatus according to the embodiment is assumed to encode 4K image data in an example described herein. The image data to be encoded has a resolution of 3840 pixels (horizontal) by 2160 pixels (vertical).

Figure 1:
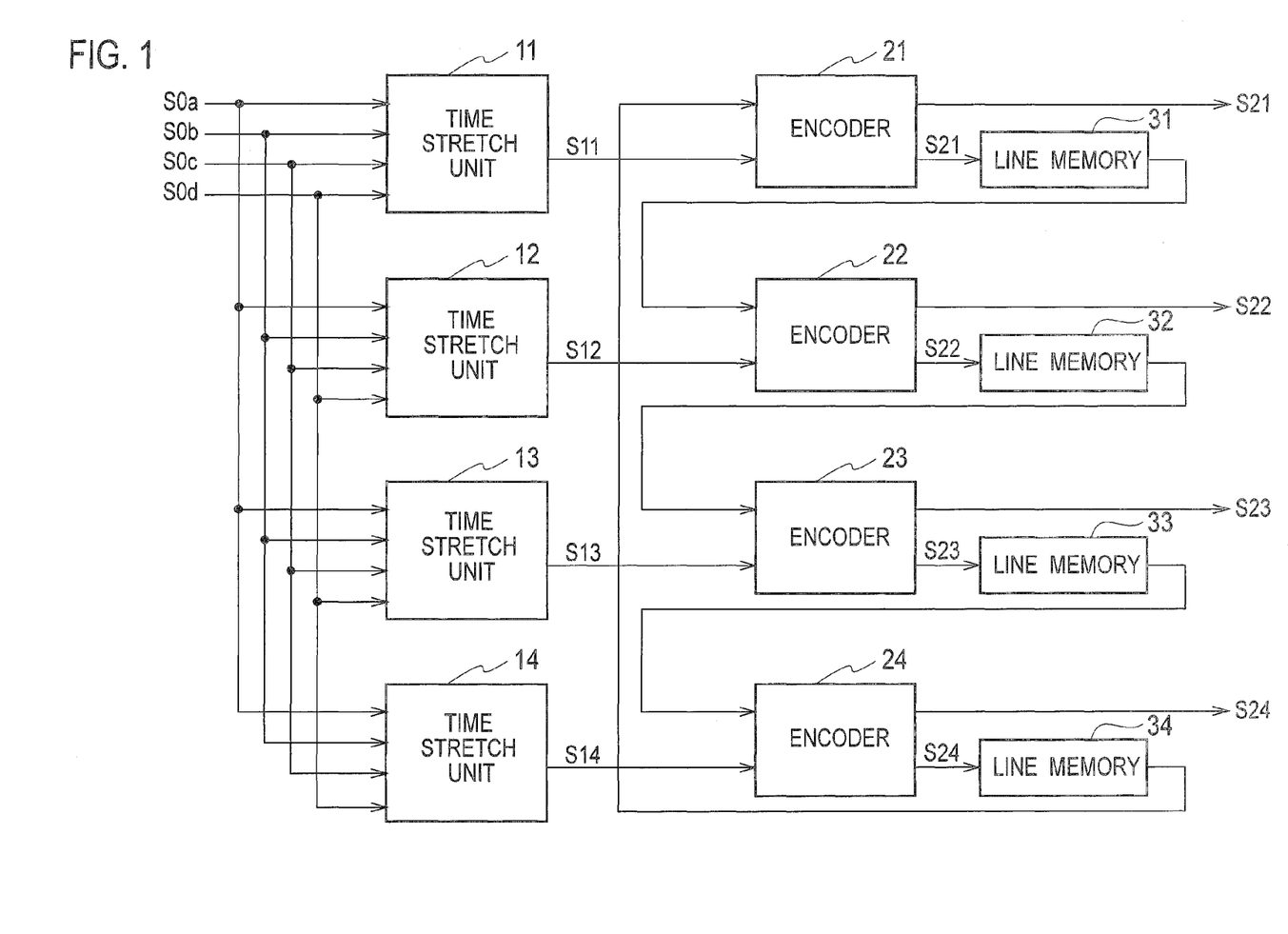
FIG. 1 is a block diagram illustrating an image encoding apparatus according to at least one embodiment.

In FIG. 1, time stretch units 11 to 14 receive image data sets S0a, S0b, S0c, and S0d, which are obtained by dividing one channel of 4K image data into four channels.

Figure 2:
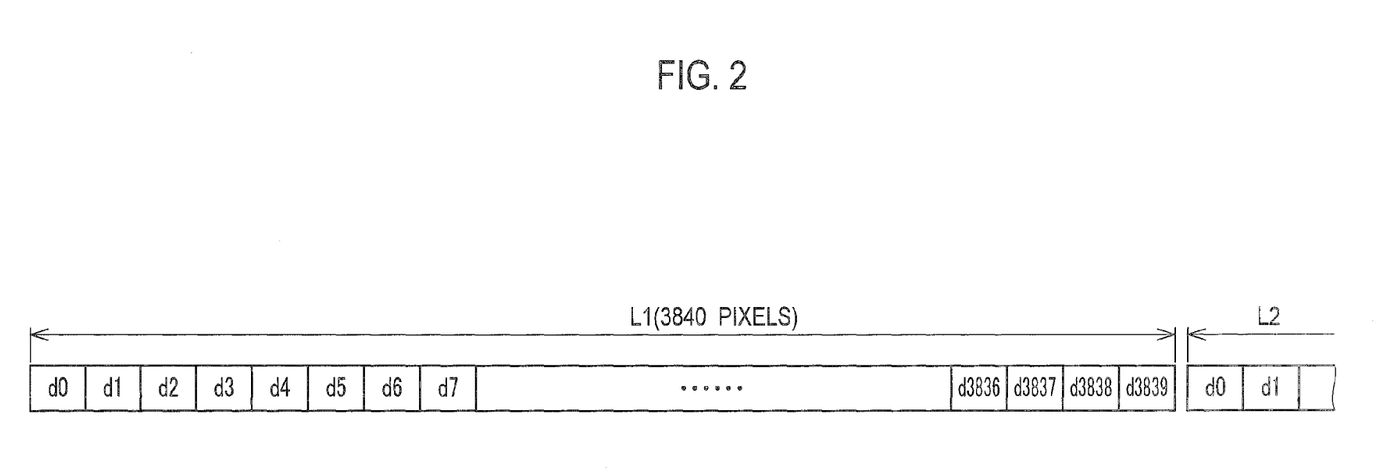
FIG. 2 is a diagram illustrating a line of 4K image data.

As illustrated in FIG. 2, each line of the 4K image data includes 3840 pixels, pixels d0 to d3839. 2160 lines in the image data are sequentially referred to as lines L1, L2, L3, and so on. Each line of the image data of one channel is divided into four channels to constitute the image data sets S0a to S0d.

The image data sets S0a to S0d correspond to channels A to D, respectively.

Figure 3:
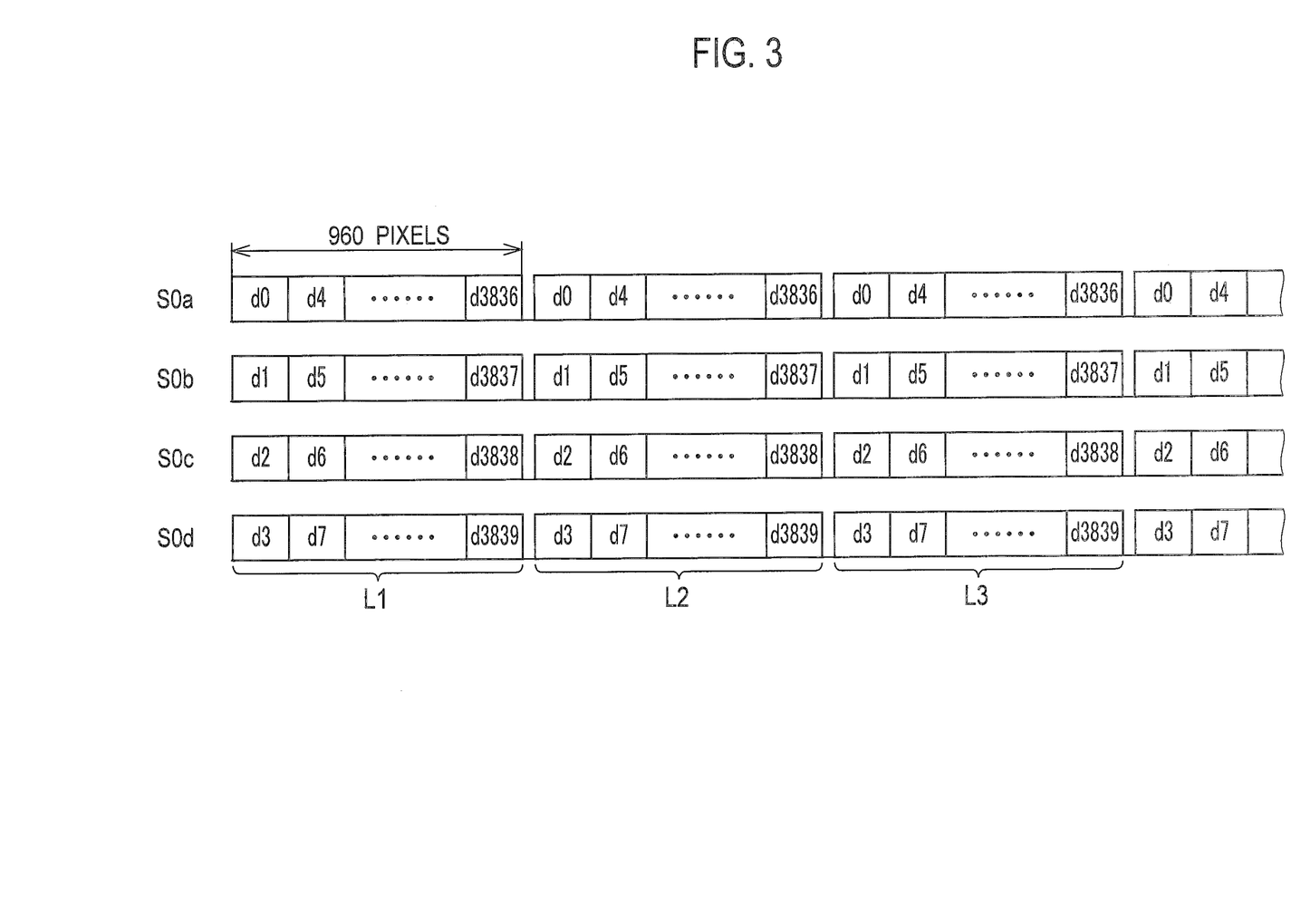
FIG. 3 is a diagram illustrating a first example of image data in which each line of 4K image data is divided into four channels.

FIG. 3 illustrates a first example of image data sets S0a to S0d of four channels. In the first example, the channels A to D are assigned cyclically to the pixels beginning with the pixel d0. The image data set S0a is composed of the pixels d0, d4, and so on to d3836. The image data set S0b is composed of the pixels d1, d5, and so on to d3837. The image data set S0c is composed of the pixels d2, d6, and so on to d3838. The image data set S0d is composed of the pixels d3, d7, and so on to d3839.

Each of the image data sets S0a to S0d is composed of a line of 960 pixels. All the image data sets S0a to S0d constitute the line L1, L2, L3, etc., which is composed of 3840 pixels.

Figure 4:
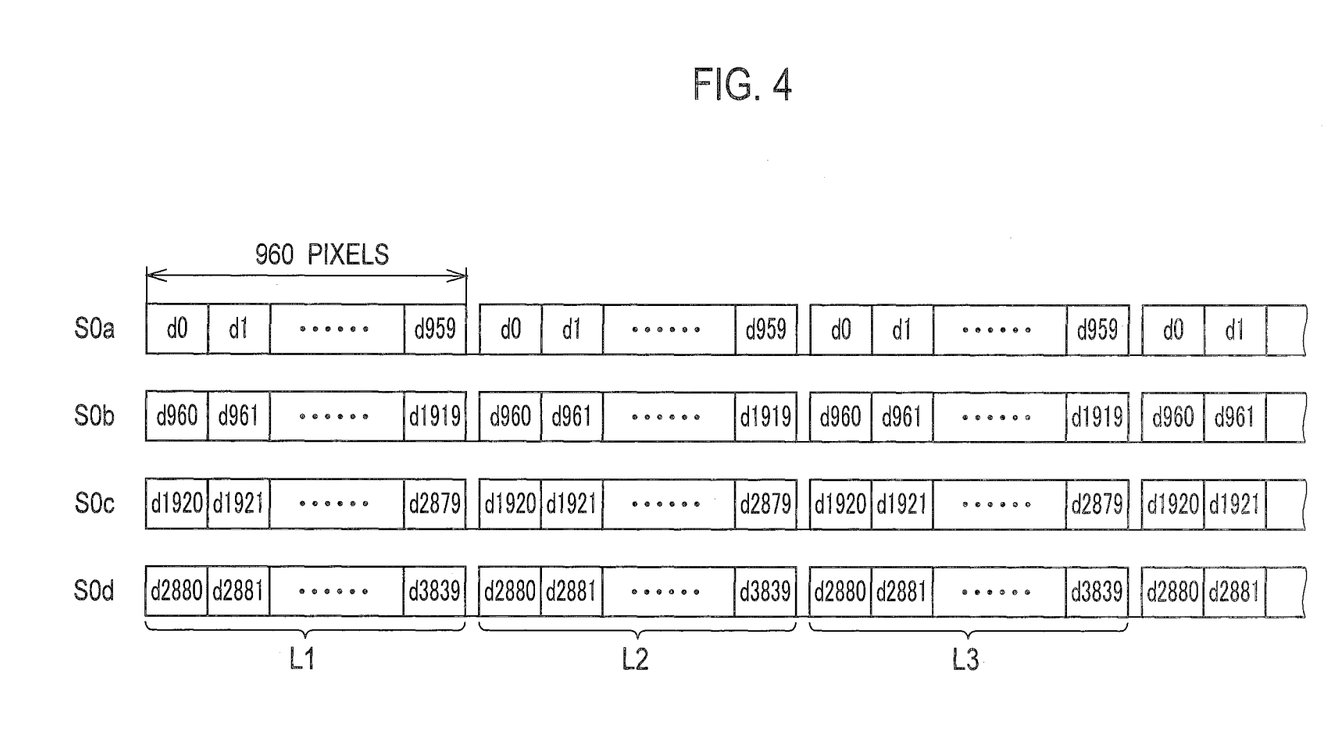
FIG. 4 is a diagram illustrating a second example of image data in which each line of 4K image data is divided into four channels.

FIG. 4 illustrates a second example of the image data sets S0a to S0d of four channels. In the second example, the pixels d0 to d959 are assigned to channel A. The pixels d960 to d1919 are assigned to channel B. The pixels d1920 to d2879 are assigned to channel C. The pixels d2880 to d3839 are assigned to channel D.

The time stretch units 11 to 14 of FIG. 1 receive the image data sets S0a to S0d of the four channels illustrated in FIG. 3 or 4, respectively. Since the 4K image data is divided into four channels, the image encoding apparatus only needs to operate at a dot clock for Full HD.

Figure 5:
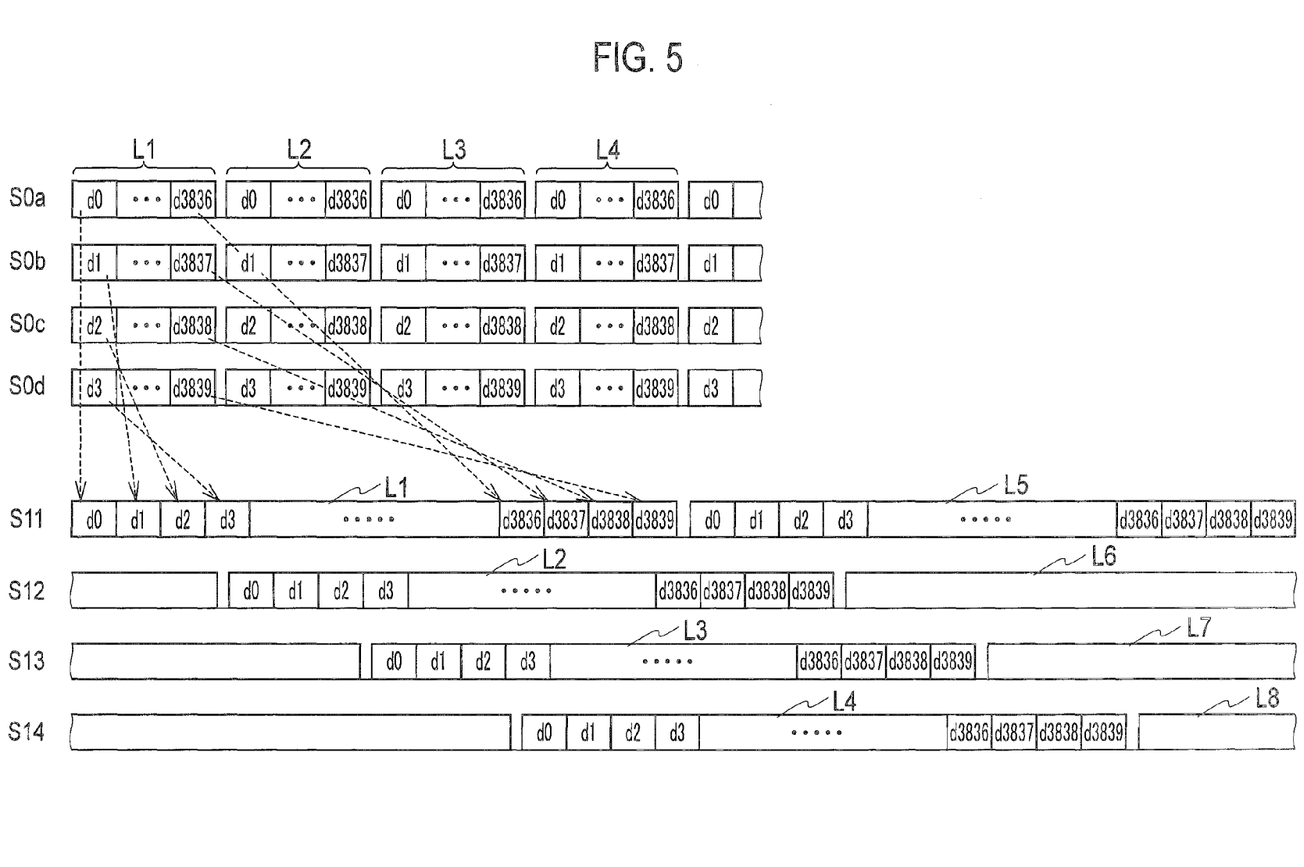
FIG. 5 is a diagram for explaining the operation of time stretch units 11 to 14 in FIG. 1 which receive the first example of image data.
Figure 6:
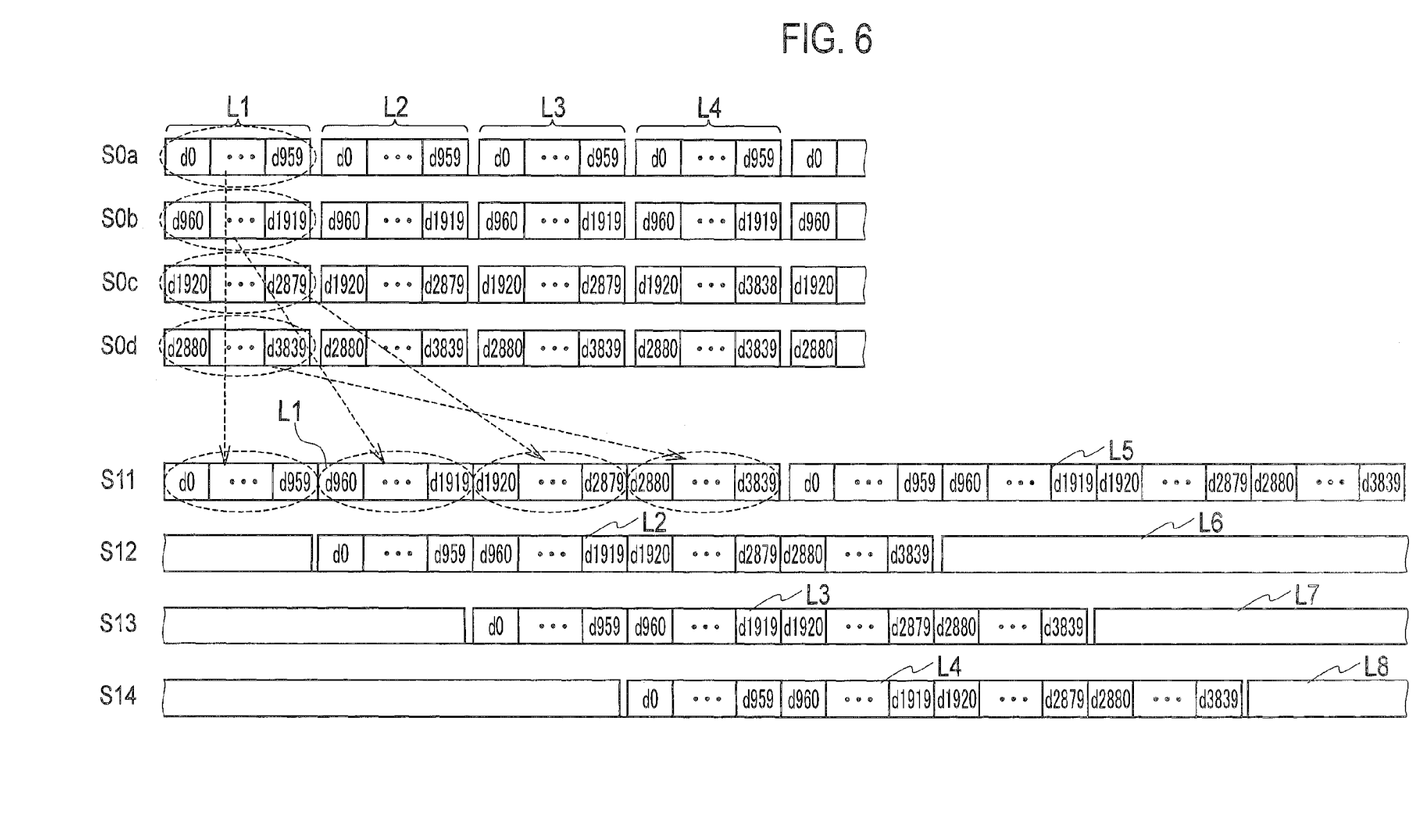
FIG. 6 is a diagram for explaining the operation of time stretch units 11 to 14 in FIG. 1 which receive the second example of image data.

The time stretch units 11 to 14 temporally stretch the image data sets S0a to S0d in the following manner. FIG. 5 illustrates an operation when the time stretch units 11 to 14 temporally stretch the image data sets S0a to S0d of FIG. 3. FIG. 6 illustrates an operation when the time stretch units 11 to 14 temporally stretch the image data sets S0a to S0d of FIG. 4.

First, using FIG. 5, a description is given of an operation of temporally stretching the image data sets S0a to S0d of FIG. 3.

As illustrated in FIG. 5, the time stretch unit 11 arranges the pixels d0 to d3839 of the image data sets S0a to S0d, constituting the line L1 in the order of pixels of the 4K image data, and outputs the image data of the line L1 as an image data set S11.

The time stretch unit 12 arranges the pixels d0 to d3839 of the image data sets S0a to S0d, constituting the line L2 in the order of pixels of the 4K image data, and outputs the image data of the line L2 as an image data set S12.

The time stretch unit 13 arranges the pixels d0 to d3839 of the image data sets S0a to S0d, constituting the line L3 in the order of pixels of the 4K image data, and outputs the image data of the line L3 as an image data set S13.

The time stretch unit 14 arranges the pixels d0 to d3839 of the image data sets S0a to S0d, constituting the line L4 in the order of pixels of the 4K image data, and outputs the image data of the line L4 as an image data set S14. The time stretch units 11 to 14 then repeat the same operation.

The time stretch unit 11 outputs image data of the lines L1, L5, L9, etc., as the image data sets S11, and the time stretch unit 12 outputs image data of the lines L2, L6, L10, etc., as the image data sets S12.

The time stretch unit 13 outputs image data of the lines L3, L7, L11, etc., as the image data sets S13, and the time stretch unit 14 outputs image data of the lines L4, L8, L12, etc., as the image data sets S14.

In this process, the time stretch units 11 to 14 are configured to output the image data of each line L1, L2, L3, etc., within a period which is longer than the one-line period of the image data sets S01 to S0d. For example, the time stretch units 11 to 14 temporally stretch the image data to four times.

When the number of channels is N (N is an integer equal to or greater than 2), the time stretch units 11 to 14 temporally stretch image data to N times, but may stretch to less than N times.

Next, using FIG. 6, a description is given of an operation of temporally stretching the image data sets S0a to S0d of FIG. 4.

As illustrated in FIG. 6, the time stretch unit 11 arranges the pixels d0 to d959 in the image data set S0a constituting the line L1, the pixels d960 to d1919 in the image data set S0b constituting the line L1, the pixels d1920 to d2879 in the image data set S0c constituting the line L1, and the pixels d2880 to d3839 in the image data sets S0d constituting the line L1, in this order. The time stretch unit 11 outputs the image data of the line L1 composed of the arranged pixels d0 to d3839 as the image data S11.

Similarly, the time stretch unit 12 outputs the image data of the line L2 composed of the arranged pixels d0 to d3839 as the image data S12. The time stretch unit 13 outputs the image data of the line L3 composed of the arranged pixels d0 to d3839 as the image data S13. The time stretch unit 14 outputs the image data of the line L4 composed of the arranged pixels d0 to d3839 as the image data S14. The time stretch units 11 to 14 then repeat the same operation.

The time stretch unit 11 outputs image data of the lines L1, L5, L9, etc., as the image data sets S11, and the time stretch unit 12 outputs image data of the lines L2, L6, L10, etc., as the image data sets S12.

The time stretch unit 13 outputs image data of the lines L3, L7, L11, etc., as the image data sets S13, and the time stretch unit 14 outputs image data of the lines L4, L8, L12, etc., as the image data sets S14.

The time stretch units 11 to 14 similarly stretch the image data to N times or less within a period longer than the one-line period of the image data sets S0a to S0d.

The time stretch units 11 to 14 can be composed of a memory in which the image data sets S0*a* to S0*d* are written and read out in the order of arrangement of pixels as illustrated in FIG. 5 or 6.

Returning to FIG. 1, the image data sets S11 to S14 outputted from the time stretch units 11 to 14 are inputted into encoders 21 to 24, respectively. The encoders 21 to 24 encode the image data sets S11 to S14 to generate encoded data sets S21 to S24, respectively. The encoders 21 to 24 can employ the configuration described in Patent Document 1, for example.

The encoders 21 to 24 can be composed of a circuit composed of hardware that is configured to encode the image data sets S11 to S14 based on an encoding algorithm to generate the encoded data sets S21 to S24, or software (a computer program).

The image data of the image data sets S11 to S14 of each line, which are inputted into the encoders 21 to 24, are the same as the corresponding line of the 4K image data set illustrated in FIG. 2. In the image data sets S11 to S14, the coding target pixel and the pixel temporally adjacent to the target pixel are therefore correlated to each other. The encoders 21 to 24 can therefore encode the image data sets S11 to S14 appropriately with high image quality.

In the second example of the image data sets S0*a* to S0*d* illustrated in FIG. 4, the target pixel is correlated with the pixel temporally adjacent thereto in most parts. Since one channel of image data is divided into four channels, the image data cannot be properly encoded around the separated pixels if the image data sets S0*a* to S0*d* are directly encoded by the encoders 21 to 24. This can result in degradation of the image quality.

The image encoding apparatus of the embodiment including the time stretch units 11 to 14 generates the encoded data sets S21 to S24 of high image quality when receiving either the image data sets S0*a* to S0*d* of the first example, or the image data sets S0*a* to S0*d* of the second example.

Line memory 31 delays the encoded data S21 by a one-line period and supplies the encoded data S21 delayed by a one-line period to the encoder 22. Line memory 32 delays the encoded data S22 by a one-line period and supplies the encoded data S22 delayed by a one-line period to the encoder 23.

Line memory 33 delays the encoded data S23 by a one-line period and supplies the encoded data S23 delayed by a one-line period to the encoder 24. Line memory 34 delays the encoded data S24 by a one-line period and supplies the encoded data S24 delayed by a one-line period to the encoder 21.

The encoders 21 to 24 may be configured to select one of the plural prediction modes. In this case, the line memories 31 to 34 also delay prediction mode indices by a one-line period and supply the prediction mode indices to the encoders 22 to 24 and 21, respectively. The prediction mode indices indicate prediction modes selected by the encoders 21 to 24.

The line memories 31 to 34 are provided if the encoders 21 to 24 respectively require the encoded data sets S24 and S21 to S23 delayed by a one-line period for encoding. The line memories 31 to 34 can be eliminated if the image encoding apparatus employs such an encoding method that the encoders 21 to 24 do not require the encoded data sets S24 and S21 to S23 delayed by a one-line period.

The encoded data sets S21 to S24 outputted from the encoders 21 to 24 are arbitrarily processed, such as being stored in an unillustrated frame memory or are multiplexed for transmission. The encoded data sets S21 to S24 are of a smaller volume than the image data sets S0*a* to S0*d*. The memory and transmission paths can be therefore configured to have a small capacity.

Herein, the time stretch units 11 to 14 are generalized as N time stretch units. The N time stretch units are configured to operate as follows in the image encoding apparatus, according to the embodiment.

The N time stretch units receive N channels of second image data. The N channels of second image data are obtained by dividing each line of first image data by N. Each line of the first image data includes a first number of pixels. The second image data is composed of a first number of bits.

Each N time stretch unit arranges pixels of the received N channels of second image data in the order of the pixels of each line of the first image data, within a period which is obtained by stretching the one-line period of the second image data. The N time stretch units thereby generate third image data, including N lines of the first image data. The N lines are adjacent to each other.

Next, the encoders 21 to 24 are generalized as N encoders. The N encoders are configured to operate as follows. The N encoders encode each coding target pixel of the third image data outputted from the N time stretch units using a difference between the target pixel and a peripheral pixel, to generate encoded data composed of a second number of bits which is smaller than the first number of bits.

The line memories 31 to 34 are generalized as N line memories. The N line memories are configured to operate as follows. Each of the N line memories delays the inputted encoded data by a one-line period, and supplies the same to the encoder which generates encoded data of a line subsequent to a line of the encoded data inputted to the line memory.

As described above, according to the image encoding method and apparatus according to the embodiment, it is possible to encode with high image quality, plural channels of image data, obtained by dividing a channel of image data.

<Image Decoding Apparatus and Method>

Figure 7:
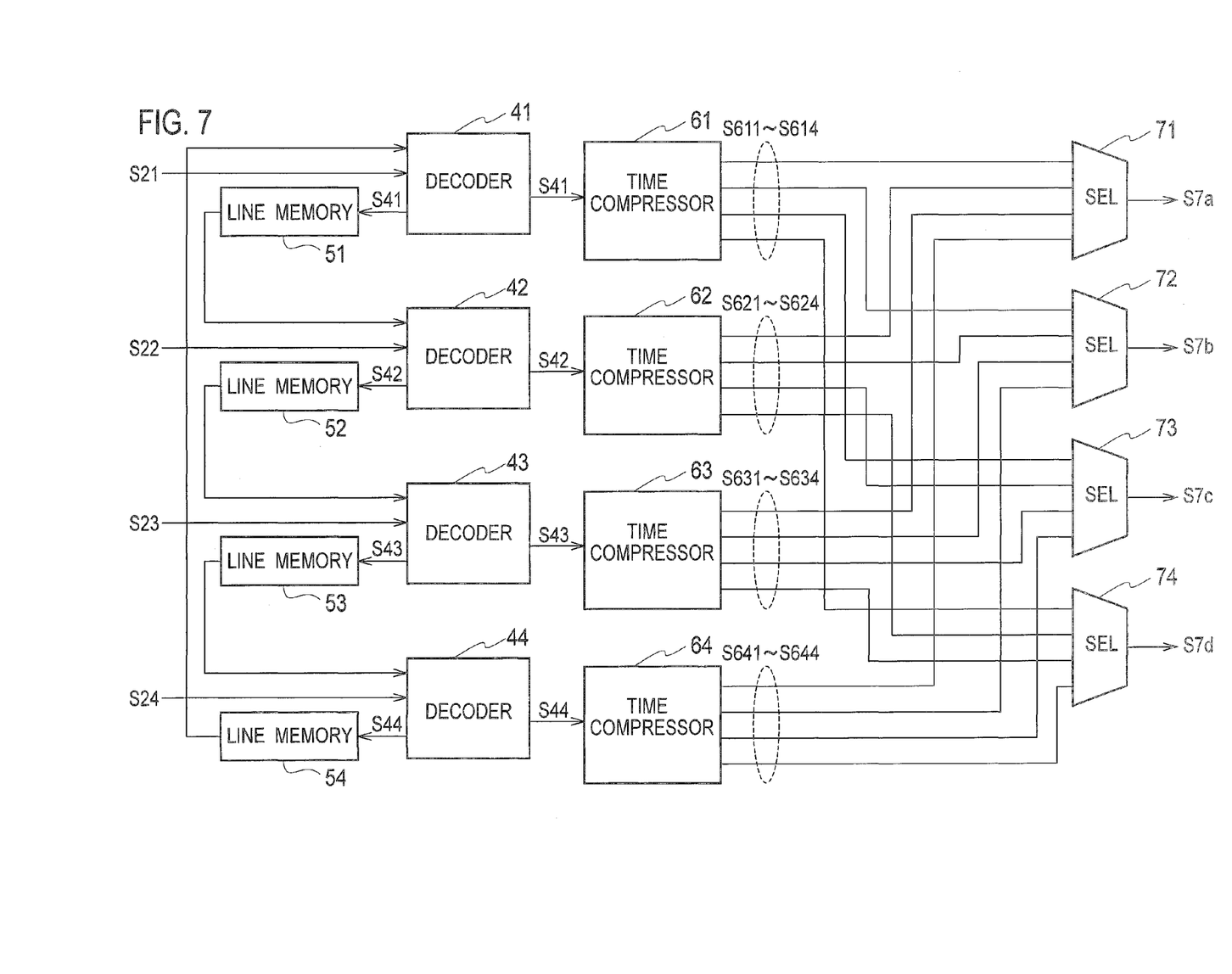
FIG. 7 is a block diagram illustrating an image decoding apparatus according to at least one embodiment.

In FIG. 7, decoders 41 to 44 receive the encoded data sets S21 to S24. The decoders 41 to 44 decode the encoded data sets S21 to S24 to generate image data sets S41 to S44, respectively. The decoders 41 to 44 can employ the configuration described in Patent Document 1.

The decoders 41 to 44 can be composed of a circuit composed of hardware which is configured to decode the encoded data sets S21 to S24 based on a decoding algorithm to generate image data sets S41 to S44, or software (a computer program), respectively.

A line memory 51 delays the image data set S41 by a one-line period and supplies the image data S41 delayed by a one-line period to the decoder 42. A line memory 52 delays the image data S42 by a one-line period and supplies the image data set S42 delayed by a one-line period to the decoder 43.

A line memory 53 delays the image data set S43 by a one-line period and supplies the image data set S43 delayed by a one-line period to the decoder 44. A line memory 54 delays the image data set S44 by a one-line period and supplies the image data set S44 delayed by a one-line period to the decoder 41.

The decoders 41 to 44 may be each configured to select one of the plural prediction modes. In this case, the line memories 51 to 54 also delay the prediction mode indices selected by the decoders 41 to 44 by a one-line period, and supply the same to the encoders 42 to 44 and 41, respectively.

The line memories 51 to 54 are provided if the decoders 41 to 44 require the image data sets S44 and S41 to S43, delayed by a one-line period for decoding, respectively. The line memories 51 to 54 can be eliminated if the image decoding apparatus employs such a decoding method that the decoders 41 to 44 do not require the image data sets S44 and S41 to S43 delayed by a one-line period.

Time compressors 61 to 64 perform a time compression operation for the inputted image data sets S41 to S44. The time compression operation is the reverse of the time stretch operation described with FIG. 5 or 6.

To be specific, the time compressor 61 distributes the pixels d0 to d3839, constituting the line L1 to N parallel channels illustrated in FIG. 5 or 6, and outputs the same as image data sets S611 to S614 corresponding to the image data sets S0a to S0d. The image data sets S611 to S614 are image data sets of the channels A to D, respectively.

The time compressor 62 distributes the pixels d0 to d3839 constituting the line L2 to the N parallel channels, and outputs the same as image data sets S621 to S624, corresponding to the image data sets S0a to S0d. The image data sets S621 to S624 are image data sets of the channels A to D, respectively.

The time compressor 63 distributes the pixels d0 to d3839 constituting the line L3 to the N parallel channels, and outputs the same as image data sets S631 to S634 corresponding to the image data sets S0a to S0d. The image data sets S631 to S634 are image data sets of the channels A to D, respectively.

The time compressor 64 distributes the pixels d0 to d3839 constituting the line L4 to N parallel channels, and outputs the same as image data sets S641 to S644, corresponding to the image data sets S0a to S0d. The image data sets S641 to S644 are image data sets of channels A to D, respectively. The time compressors 61 to 64 then repeat the same operation.

The time compressors 61 to 64 can be composed of a memory in which the image data sets S41 to S44 are written and are divided into channels A to D to be read.

The selectors 71 to 74 receive the image data sets S611 to S614, S621 to S624, S631 to S634, and S641 to S644.

The selector 71 selects the image data sets S611, S621, S631, and S641 for channel A in the image data sets S611 to S614, S621 to S624, S631 to S634, and S641 to S644, and outputs the same as an image data set S7a for channel A.

The selector 72 selects the image data sets S612, S622, S632, and S642 for channel B in the image data sets S611 to S614, S621 to S624, S631 to S634, and S641 to S644 and outputs the same as an image data set S7b for channel B.

The selector 73 selects the image data sets S613, S623, S633, and S643 for channel C in the image data sets S611 to S614, S621 to S624, S631 to S634, and S641 to S644 and outputs the same as an image data set S7c for channel C.

The selector 74 selects the image data sets S614, S624, S634, and S644 for channel D in the image data sets S611 to S614, S621 to S624, S631 to S634, and S641 to S644 and outputs the same as an image data set S7d for channel D.

The selectors 71 to 74 can be composed of a circuit composed of hardware or software (a computer program).

The image data sets S7a to S7d correspond to the image data sets S0a to S0a of FIG. 1 respectively, but are not completely the same as the image data sets S0a to S0d, due to errors generated in the coding and decoding processes.

Herein, the decoders 41 to 44 are generalized as N decoders. The N decoders are not configured to operate as follows.

The N decoders decode each decoding target pixel of N channels of encoded data, which includes a first number of pixels in each line and is composed of a first number of bits, using a difference between the target pixel and a peripheral pixel. The N is an integer not less than 2. The N decoders generate first image data composed of a second number of bits which is larger than the first number of bits. The N channels of encoded data include encoded data of adjacent N lines.

The time compressors 61 to 64 are generalized as N time compressors. The N time compressors are configured to operate as follows. The N time compressors distribute the pixels included in each line of first image data outputted from the N decoders, into parallel N channels within a period obtained by compressing a one-line period of the first image data to generate N channels of second image data.

The selectors 71 to 74 are generalized as N selectors. The N selectors are configured to operate as follows. The N selectors select the respective N channels of the second image data outputted from the N time compressors to generate N channels of third image data.

In some cases, a memory is provided before the image decoding apparatus illustrated in FIG. 7, to adjust the phase and data configuration of encoded data to be supplied to the image decoding apparatus. In such a case, the configuration of the image decoding apparatus is properly changed in accordance with the phase and data configuration of the encoded data.

According to the image decoding apparatus and method of the embodiment, plural channels of encoded data can be decoded into plural channels of image data that are obtained by dividing a channel of image data.

The present invention is not limited to the embodiment described above, and can be variously changed without departing from the scope of the invention. In FIGS. 1 and 7, since N is set to 4, the image encoding and decoding apparatuses include four each of the constituent components. The number of each constituent component may be set to a value in accordance with N.

What is claimed is:

1. A computer software product that includes a non-transitory storage medium readable by a processor, the non-transitory storage medium having stored thereon a set of instructions for performing image encoding to encode first image data in which each line includes a first number of pixels, the set of instructions comprising:

(a) a first set of instructions which, when loaded into main memory and executed by the processor, causes the processor to establish N time stretch units to arrange pixels of N channels of second image data in the order of pixels in the respective lines of the first image data, within a period obtained by stretching a one-line period of the second image data to generate third image data including N lines of the first image data, the N channels of second image data being obtained by dividing the first image data by N and being composed of a first number of bits, the N being an integer equal to or greater than 2; and (b) a second set of instructions which, when loaded into main memory and executed by the processor, causes the processor to establish N encoders to encode each coding target pixel of the third image data outputted from the N time stretch units, using a difference between the target pixel and a peripheral pixel to generate encoded data composed of a second number of bits, which is smaller than the first number of bits.

2. The computer software product according to claim 1, further comprising a third set of instructions which, when loaded into main memory and executed by the processor, causes the processor to establish N line memories to delay the encoded data outputted from the respective N encoders by a one-line period, wherein each of the N line memories is configured to supply the encoded data delayed by the one-line period to one of the N encoders which generate encoded data of a subsequent line to the encoded data inputted to the line memory.

3. An image encoding method to encode first image data in which each line includes a first number of pixels, comprising:
   arranging pixels of N channels of second image data in memory in the order of pixels in the respective lines of the first image data, within a period obtained by stretching a one-line period of the second image data to generate third image data including N lines of the first image data, the N channels of second image data being obtained by dividing the first image data by N and being composed of a first number of bits, the N being an integer equal to or greater than 2; and
   encoding each encoding target pixel of the third image data using a difference between the target pixel and a peripheral pixel to generate encoded data composed of a second number of bits, which is smaller than the first number of bits.

4. A computer software product that includes a non-transitory storage medium readable by a processor, the non-transitory storage medium having stored thereon a set of instructions for performing image decoding, the set of instructions comprising:
   (a) a first set of instructions which, when loaded into main memory and executed by the processor, causes the processor to establish N decoders to decode each decoding target pixel of N channels of encoded data, in which each line includes a first number of pixels and that is composed of a first number of bits, using a difference between the target pixel and a peripheral pixel to generate first image data composed of a second number of bits which is larger than the first number of bits, the N being an integer equal to or greater than 2;
   (b) a second set of instructions which, when loaded into main memory and executed by the processor, causes the processor to establish N time compressors to distribute the pixels included in each line of the first image data output from the N decoders, into parallel N channels within a period obtained by compressing a one-line period of the first image data, to generate N channels of second image data; and
   (c) a third set of instructions which, when loaded into main memory and executed by the processor, causes the processor to establish N selectors to select the respective N channels of second image data outputted from the N time compressors to generate N channels of third image data.

5. The computer software product according to claim 4, further comprising a fourth set of instructions which, when loaded into main memory and executed by the processor, causes the processor to establish N line memories configured to delay the first image data outputted from the respective N decoders by the one-line period, wherein the first image data delayed by the one-line period and outputted from the N line memories are supplied to the decoder generating a line of the first image data subsequent to the line of the first image data inputted to the line memory.

6. An image decoding method comprising:
   decoding each decoding target pixel of N channels of encoded data, in which each line includes a first number of pixels, and that is composed of a first number of bits, using a difference between the target pixel and a peripheral pixel to generate first image data composed of a second number of bits, which is larger than the first number of bits, the N being an integer equal to or greater than 2;
   writing the first image data in memory;
   reading the first image data from the memory to distribute the pixels included in each line of the first image data into parallel N channels within a period obtained by compressing a one-line period of the first image data, to generate N channels of second image data; and
   generating N channels of third image data by selecting the respective N channels of second image data.

* * * * *

UNITED STATES PATENT AND TRADEMARK OFFICE
CERTIFICATE OF CORRECTION

| | |
|---|---|
| PATENT NO. | : 10,230,982 B2 |
| APPLICATION NO. | : 15/222148 |
| DATED | : March 12, 2019 |
| INVENTOR(S) | : Maki Takami and Hideki Aiba |

It is certified that error appears in the above-identified patent and that said Letters Patent is hereby corrected as shown below:

On the Title Page

Please delete and replace with following Applicant City:
Item (71) Applicant: JVC KENWOOD Corporation, Yokohama-shi, Kanagawa (JP)

Signed and Sealed this
Twenty-seventh Day of August, 2019

Andrei Iancu
*Director of the United States Patent and Trademark Office*